US006574854B1

United States Patent
Moran

(10) Patent No.: US 6,574,854 B1
(45) Date of Patent: Jun. 10, 2003

(54) METHOD FOR REDUCING MAGNETIC HEAD WRITE GAP CURVATURE OF A PLATED WRITE GAP

(75) Inventor: Timothy J. Moran, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 129 days.

(21) Appl. No.: 09/605,168

(22) Filed: Jun. 27, 2000

(51) Int. Cl.$^7$ .......................... G11B 5/127; H04R 31/00
(52) U.S. Cl. ................ 29/603.15; 29/603.14; 29/603.13; 29/603.16
(58) Field of Search ........................ 29/603.12–603.16

(56) References Cited

U.S. PATENT DOCUMENTS

| 5,804,085 A | * | 9/1998 | Wu et al. ................. 29/603.15 |
| 6,238,582 B1 | * | 5/2001 | Williams et al. ............... 216/22 |
| 6,329,211 B1 | * | 12/2001 | Terunuma et al. ........ 29/603.15 |

* cited by examiner

*Primary Examiner*—Richard Chang
(74) *Attorney, Agent, or Firm*—Robert O. Guillot; Intellectual Property Law Offices

(57) ABSTRACT

A method for forming a magnetic head to solve the curved electrodeposited write gap layer problem by initially fabricating the write gap layer to be wider than the intended final P2 pole tip width. Ion milling the sides of the P2 pole tip structure is then performed to remove the curved outer portions of the write gap layer and to thereby fabricate a P2 pole tip having the desired pole tip width. Specifically, following the electrodepositing of the write gap layer and P2 pole tip thereon, an ion milling step is conducted to remove material from the sidewalls of the P2 pole tip including the write gap layer. The ion milling step is preferably conducted utilizing a broad beam ion milling device that is directed to the surface of the substrate upon which the magnetic heads are being fabricated. Preferably, the ion beam is directed at an angle of approximately 70° away from normal to the substrate surface such that milling of the head side surfaces is efficiently accomplished. Following the ion milling step the curved edges of the write gap layer are removed and the P2 pole tip width is narrowed to its desired dimension. Thereafter, further well known fabrication steps are conducted to complete the fabrication of the magnetic head.

14 Claims, 2 Drawing Sheets

METHOD FOR REDUCING MAGNETIC HEAD WRITE GAP CURVATURE OF A PLATED WRITE GAP

BACKGROUND OF THE INVENTION

1. Field of the Invention

The present invention relates generally to methods for fabricating magnetic heads for hard disk drives, and more particularly to magnetic head fabrication methods that include the electroplating of a write gap layer therewithin.

2. Description of the Prior Art

As is well known to those skilled in the art, typical magnetic heads for reading and writing data to magnetic media include two magnetic poles with a write gap layer formed between the two poles. In a data writing process, magnetic flux is caused to pass between the magnetic poles across the write gap, and magnetic data bits are thereby formed on the magnetic media that is disposed proximate the magnetic head. To facilitate accurate subsequent reading of the written data bits, it is important that each data bit be generally rectangularly shaped; that is, with straight, parallel leading and trailing edges. This data bit shape is produced by the write head, and particularly by the shape of the leading and trailing edges of the write gap layer. Therefore, it is important to the efficient functioning of hard disk drive device that the leading and trailing edges of the write gap layer of the magnetic head be straight and parallel to each other.

In standard prior art magnetic head fabrication techniques a plurality of magnetic heads are fabricated upon the surface of a substrate, and the write gap layer is uniformly deposited as a thin film across the entire surface of the substrate utilizing a deposition process such as vacuum sputtering. After the magnetic heads on the substrate are fabricated, the substrate is diced to form individual heads. As a result the deposited write gap layer of each magnetic head has straight parallel leading and trailing edges that produce the desired magnetic bit shape.

The present invention relates to a different magnetic head fabrication method wherein the write gap layer is electroplated utilizing a patterned photoresist. This fabrication method has various advantages over the prior art thin film write gap layer sputtering method; however, it can result in a curvature of the leading and/or trailing edges of the write gap layer. This curvature of the leading and trailing edges of the write gap layer creates a correspondingly curved magnetic data bit upon the surface of magnetic media, which leads to the data recording and reading problems referenced above. Furthermore, in current magnetic head fabrication techniques, where the P2 pole tips are made narrower to increase the disk data areal storage density, this write gap layer curvature becomes an increasingly significant problem.

SUMMARY OF THE INVENTION

The present invention solves the curved electrodeposited write gap layer problem by initially fabricating the write gap layer to be wider than the intended final P2 pole tip width. Ion milling the sides of the P2 pole tip structure is then performed to remove the curved outer portions of the write gap layer and to thereby fabricate a P2 pole tip having the desired pole tip width. Specifically, following the electrodepositing of the write gap layer and P2 pole tip thereon, an ion milling step is conducted to remove material from the sidewalls of the P2 pole tip including the write gap layer. The ion milling step is preferably conducted utilizing a broad beam ion milling device that is directed to the surface of the substrate upon which the magnetic heads are being fabricated. Preferably, the ion beam is directed at an angle of approximately 70° away from normal to the substrate surface such that milling of the head side surfaces is efficiently accomplished. As a result of the ion milling step the curved edges of the write gap layer are removed, and the P2 pole tip width has thereby been narrowed to its desired dimension. Thereafter, further well known fabrication steps are conducted to complete the fabrication of the magnetic head.

It is an advantage of the magnetic head fabrication method of the present invention that a magnetic head having an electroplated write gap layer including straight, parallel leading and trailing edges has been developed.

It is another advantage of the magnetic head fabrication method of the present invention that a magnetic head having an electrodeposited write gap layer has been developed that produces rectangular magnetic data bits upon magnetic media.

It is a further advantage of the magnetic head fabrication method of the present invention that a single broad beam ion milling step is utilized to simultaneously fabricate a plurality of magnetic heads upon a substrate surface.

These and other features and advantages of the present invention will no doubt become apparent to those skilled in the art upon reading the following detailed description which makes reference to the several figures of the drawings.

IN THE DRAWINGS

DETAILED DESCRIPTION OF THE PREFERRED EMBODIMENTS

Figure 1:
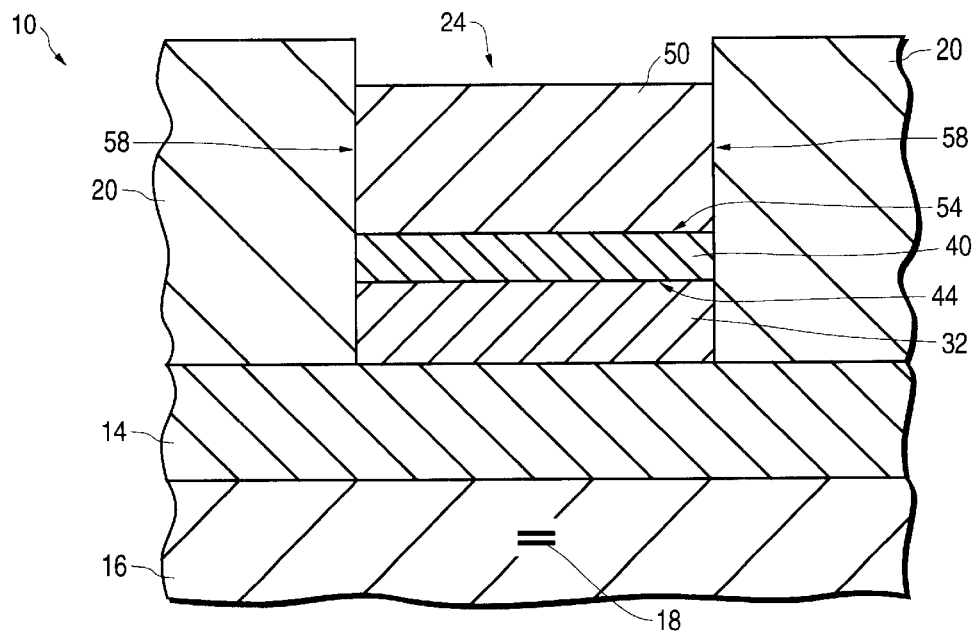
FIG. 1 is a side cross-sectional view depicting the magnetic head electroplating fabrication steps of the present invention.

FIG. 1 depicts a point in the fabrication process of a magnetic head 10 of the present invention upon a substrate that serves as a starting point for the following description of the present invention. As depicted in FIG. 1, a first magnetic pole (P1) layer 14 has been fabricated upon an insulative layer 16 of the magnetic head 10. Where the magnetic head 10 is a merged magnetic head (as is known to those skilled in the art), the layer 16 will constitute an insulative layer including a previously deposited read head element 18, and in this head configuration the P1 layer also serves as a magnetic shield layer for the read head element. Alternatively, when a magnetic head 10 is fabricated in a well known configuration with a separate magnetic shield layer (not shown), the insulative layer 16 will be disposed between that separate shield layer and the P1 magnetic pole layer 14. Therefore, in either magnetic head embodiment the insulative layer 16 provides surface for the P1 layer 14, and it is a suitable starting point to describe the inventive features of the present invention.

In fabricating a first embodiment of the present invention, a patterned layer 20 is next fabricated upon the P1 layer 14 such that a hole or trench 24 is formed at the desired location of the P2 pole tip of the head, which is generally directly above the read head element 18. In the preferred embodiment, a photoresist is utilized to form the layer 20, and the trench 24 is fabricated using photolithographic techniques that are well known to those skilled in the art. Following the creation of the trench 24, a P1 pole pedestal 32 may be advantageously electroplated into the trench 24. The P1 pedestal 32 may be formed from the same material as the P1 pole, such as Permalloy, although it may also be formed utilizing a high magnetic moment material such as NiFe 80/20. The presence of the P1 pedestal 32 can serve to reduce side writing between the P2 pole tip (to be fabricated) and the P1 pole 14, as is known to those skilled in the art.

Following the electroplating of the P1 pedestal 32, a write gap layer 40 is electroplated into the trench 24 upon the upper surface 44 of the P1 pedestal 32. Thus the photoresist remains in place and assures the accurate alignment of the plated write gap layer 40 with the top of the P1 pedestal. The material which comprises the write gap layer 40 must be capable of being successfully electroplated upon the surface 44 of the P1 pedestal, and must also have appropriate magnetic properties such that it can serve as a write gap layer material within the magnetic head 10. One such material that can be electroplated and is suitable to form the write gap layer 40 is NiP, although other material may also be suitable, and the present invention is not to be limited to the specific material that comprises the write gap layer.

Following the electroplating of the write gap layer 40, a P2 pole tip 50 is electroplated into the trench 24 upon the upper surface 54 of the write gap layer 40. Thus, the patterned photoresist layer 20 remains in place and assures the accurate alignment of the plated P2 pole tip 50 with the write gap layer 40 and the P1 pedestal 32 because each of those layers is sequentially deposited into the trench 24. Following the electroplating of the P2 pole tip 50 the photoresist layer 20 is stripped away utilizing well known photolithographic techniques, such that the sides 58 of the write head structure, including layers 32, 40 and 50, are exposed.

Figure 2:
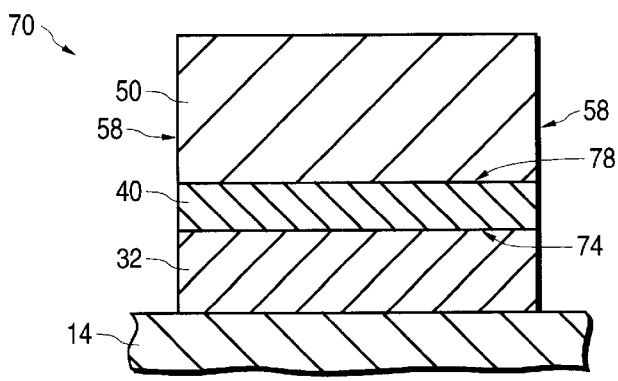
FIG. 2 is a cross-sectional view depicting a desired write gap layer configuration.
Figure 3:
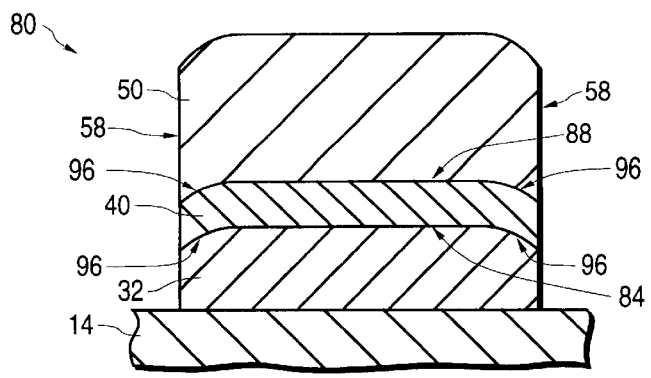
FIG. 3 is a side cross-sectional view depicting an undesirable write gap layer configuration.

As indicated hereabove, a magnetic head structure is unacceptable where the leading and trailing edges of the write gap layer 40 are not straight and parallel. The inventors hereof have discovered that the electroplated write gap layer 40 of the heads 10 can often possess unwanted curved surfaces. By way of example, FIG. 2 is an elevational view depicting an acceptable electroplated head, and FIG. 3 is an elevational view depicting an unacceptable electroplated head having a curved write gap layer that is typical of an electodeposition process. As depicted in FIG. 2, the head 70 includes a write gap layer 40 formed between a P1 pedestal 32 and a P2 pole tip 50. It is to be noted that the write gap layer 40 includes a leading edge 74 and a trailing edge 78 that are straight and parallel to each other. In comparison thereto, FIG. 3 depicts a plated head 80 including a P1 pedestal 32, a write gap layer 40 and a P2 pole tip 50. Significantly, the write gap layer 40 is formed with a leading edge 84 and a trailing edge 88 that are not straight and parallel. Specifically, while a central portion of the edges 84 and 88 are generally straight and parallel, the side portions 96 of the edges 84 and 88 are curved. Such curved side edge portions 96 are problematic in that magnetic data bits formed by a head 80 with such curved write gap edges 84 and 88 will create similarly shaped magnetic data bits which can create unacceptable data reading problems, as indicated above.

In fabricating a write gap layer by electroplating within narrow trenches 24, a curvature in layer surfaces proximate the trench edges, such as curvatures 96, is commonly encountered. The reasons for such curvatures are complicated, and may result from uneven plating deposition rates from the center of the trench to the edges of the trench, as well as other effects caused by the proximity of the trench sidewalls. Regardless of the reasons for the creation of the curved edges 96, the present invention provides a solution, as is next described.

Figure 4:
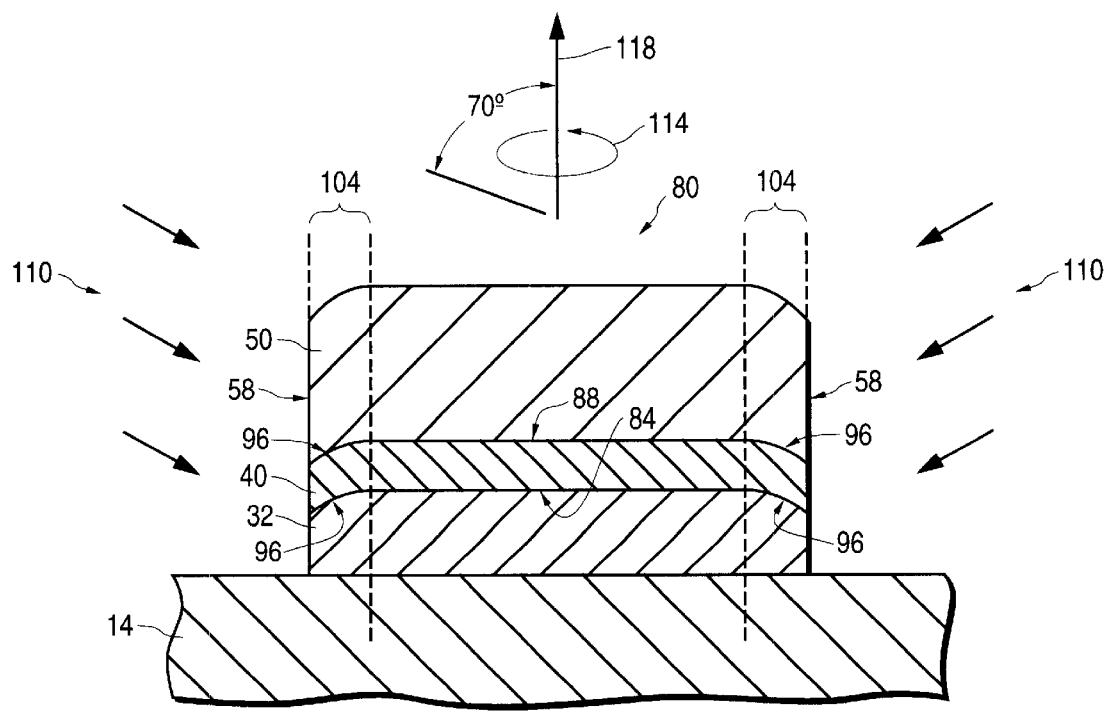
FIG. 4 is a side cross-sectional view of the head depicted in FIG. 3 showing the ion milling fabrication step of the present invention.

FIG. 4 is an enlarged view of the head 80 depicted in FIG. 3, as created by the electrodeposition process described above with reference to FIG. 1. The write gap layer 40 includes leading and trailing edges 84 and 88 respectively having curved edge portions 96 formed proximate the sidewalls 58 of the head 80. Investigation by the inventors has determined that a significant amount of the curved edge portions 96 occur in an outer region 104 comprising approximately 20% of the write gap layer on each side of the head 80. Recognizing this, the present invention solves the curved write gap problem by including a further fabrication step of exposing the substrate surface and therefore each projecting head 80 to ion milling 110 to remove the outer 20% of magnetic head material from each side 58 of the projecting head 80 following the photoresist stripping step described above. The ion milling process is conducted utilizing a broad milling beam that covers the substrate surface, while the substrate is typically mounted on a stage that is rotatable 114. The milling beam is preferably directed at a large angle away from normal 118 to the substrate surface, such as approximately 70°, such that the ion beam is primarily directed to the sides 58 of the outwardly projecting magnetic head structures 80.

Figure 5:
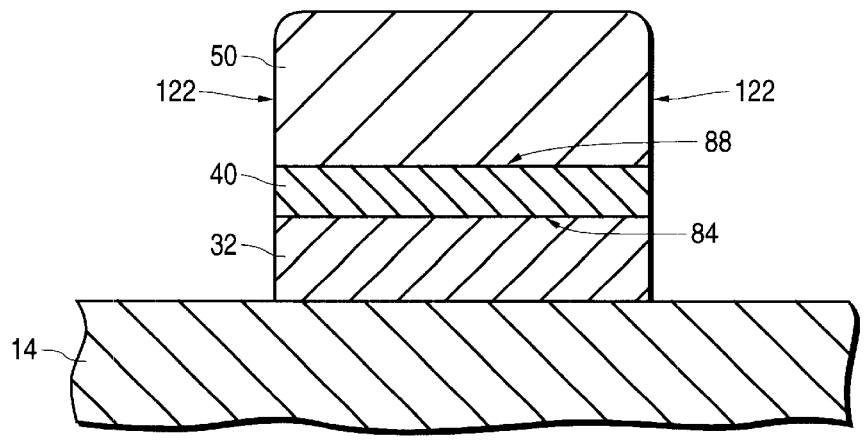
FIG. 5 is a side cross-sectional view of the magnetic head depicted in FIG. 4, following the ion milling step of the present invention.

The head structure following the ion milling step is depicted in FIG. 5. In comparison with FIG. 4, it is seen that the side portions 104 of FIG. 4 having the curved write gap edges 96 have been removed, such that milled sidewalls 122 are formed. It is significant to note that the leading and trailing edges 84 and 88 of the write gap layer are now straight and parallel, as desired. With the ion milling step 110 in mind, the initial photoresist trench 24 for a magnetic head of the present invention is fabricated approximately 40% wider than the desired final P2 pole tip width. That is, where a desired P2 pole tip width is approximately 0.3 microns, the trench 24 is fabricated with a width of 0.5 microns, such that 20% of the width (0.1 microns) can be ion milled from each side 58 of the plated up head. Following the removal of 0.1 microns of material from each side of the plated up head, the final P2 pole tip width will be 0.3 microns, as desired, with a write gap layer having straight, parallel edges 84 and 88.

While the invention has been shown and described with regard to certain preferred embodiments, it is be understood that those skilled in the art will no doubt devise certain alterations and modifications in form and detail which nevertheless include the true spirit and scope of the present invention. It is therefore intended that the following claims cover all such alterations and modification that nevertheless include the true spirit and scope of the invention.

What is claimed is:

1. A method for fabricating a magnetic head, comprising the steps of:

forming a first magnetic pole (P1) layer upon an insulation layer;

depositing a photoresist layer upon said P1 layer;

forming a trench within said photoresist layer for fabricating a pole tip of a second magnetic pole (P2) therewithin;

electrodepositing a write gap layer within said trench; said write gap layer being formed to include a central portion and side portions, and wherein said central portion includes approximately 60% of said write gap layer, and is formed with flat, parallel upper and lower write gap surfaces; and said side portions each include approximately 20% of said write gap layer, and are formed with curved upper and lower write gap surfaces;

electrodepositing a P2 pole tip within said trench upon said gap layer;

removing said photoresist layer after the step of electrodepositing said P2 pole tip; and removing said side portions of said write gap layer after the step of removing said photoresist layer.

2. The method for fabricating the magnetic head as described in claim 1 wherein said step of removing said side portions of said write gap layer is performed by ion milling.

3. The method for fabricating the magnetic head as described in claim 2 wherein the step of performing said ion milling is conducted utilizing a broad beam ion milling device, and wherein said magnetic head is disposed upon a surface of a rotating substrate.

4. The method for fabricating the magnetic head as described in claim 3 further including a step of directing said ion milling beam at said magnetic head at an angle of approximately 70° from a normal to said substrate surface.

5. The method for fabricating the magnetic head as described in claim 1 wherein said central portion of said write gap layer is formed with a leading edge that is approximately 0.3 microns long, and each of said side portions of said write gap layer is formed with a leading edge that is approximately 0.1 microns long.

6. The method for fabricating the magnetic head as described in claim 1 wherein the step of electrodepositing said write gap layer is performed using nickel phosphate (NiP).

7. A method for fabricating a magnetic head, comprising the steps of:

fabricating a read head portion of said magnetic head upon a surface of a substrate;

fabricating a first magnetic pole (P1) layer upon said read head portion;

depositing a photoresist layer upon said P1 layer;

forming a trench within said photoresist layer;

electroplating a P1 pole pedestal within said trench, said P1 pole pedestal having an upper surface thereof;

electroplating a write gap layer within said trench upon said upper surface of said P1 pole pedestal, said write gap layer having a leading edge and a trailing edge thereof, said leading and trailing edges of said write gap layer each being formed with a relatively flat central portion and curved side portions;

electrodepositing a P2 pole tip within said trench upon said write gap layer;

removing said photoresist layer after the step of electrodepositing said P2 pole tip, whereby the sidewall portions of said P1 pole pedestal, said write gap layer and said P2 pole tip are exposed;

removing said sidewall portions of said P1 pole pedestal, said write gap layer and said P2 pole tip.

8. The method for fabricating the magnetic head as described in claim 7 wherein said central portion is formed to include approximately 60% of a length of said leading edge, and each of said side portions are formed to include approximately 20% each of said length of said leading edge.

9. The method for fabricating the magnetic head as described in claim 7 wherein said step of removing write gap material is performed by ion milling.

10. The method for fabricating the magnetic head as described in claim 9 wherein the step of performing said ion milling is conducted utilizing a broad beam ion milling device, and wherein said magnetic head is disposed upon the surface of said substrate that is rotated within an ion milling beam.

11. The method for fabricating the magnetic head as described in claim 10 further including a step of directing said ion milling beam at said magnetic head at an angle of approximately 70° from a normal to said substrate surface.

12. The method for fabricating the magnetic head as described in claim 8 wherein said central portion of said write gap layer is approximately 0.3 microns, and each of said side portions of said write gap layer is approximately 0.1 microns.

13. The method for fabricating the magnetic head as described in claim 7 wherein the step of electroplating said write gap layer is performed using nickel phosphate (NiP).

14. The method for fabricating the magnetic head as described in claim 13 wherein said P1 pole pedestal is comprised of 80% nickel (Ni) and 20% iron (Fe).

* * * * *